3,200,093
WAX-CHLORINATED ETHYLENE POLYMER OR ETHYLENE-VINYL CHLORIDE COPOLYMER COMPOSITIONS
Richard W. Sauer, Haddonfield, N.J., and Ralph L. Rogers, Norwood, Pa., assignors to The Atlantic Refining Company, Philadelphia, Pa., a corporation of Pennsylvania
No Drawing. Filed June 2, 1961, Ser. No. 114,327
3 Claims. (Cl. 260—28.5)

This invention relates to compositions comprising a hydrocarbon wax and a chlorine-containing polymer of ethylene. More particularly, this invention relates to compositions comprising a hydrocarbon wax and a chlorinated ethylene polymer or a copolymer of ethylene with vinyl chloride.

Hydrocarbon waxes have been modified by the addition thereto of small amounts of ethylene polymers. It was found, however, that polyethylene is only slightly soluble in wax so that the polyethylene settles out of solution at temperatures considerably above the melting point of the wax. It is necessary therefore to utilize temperatures closely approaching the melting point of the polymer itself in order to obtain a homogeneous solution. Hydrocarbon waxes, particularly petroleum hydrocarbon waxes, are generally shipped in the molten condition because of the ease of handling in the liquid state. In order, therefore, that the polyethylene polymer will not settle out of solution, it is necessary to use high temperatures for shipping, which is undesirable because of the costs involved and, moreover, there is the danger of having the polyethylene settle out of solution if the temperature should drop. Once the polyethylene has settled out of solution, it is difficult to resolubilize it without a vigorous mixing operation.

Waxes are utilized in the molten condition for coating products such as milk cartons and frozen food wraps and in paper laminating operations. Problems arise, however, in utilizing wax-polyethylene blends for these purposes since the polyethylene tends to settle out of the molten wax in the storage vessels prior to being used in the coating or laminating machines unless the vessels are maintained at high temperatures with vigorous agitation of the blends. Since high temperatures favor oxidative deterioration, it is necessary to use oxidation inhibitors in the wax blends which materials add to the costs of the compositions. Accordingly, the amount of polyethylene utilized has been limited in milk carton coating compositions, for example, to from 0.2 weight percent to 2.0 weight percent of the wax. These compositions have been found to have rather poor heat sealing properties and poor flexibility so that the coating cracks when flexed at low temperatures. This, of course, is disadvantageous for such materials as milk cartons and frozen food wrappers since these must be utilized at low temperatures.

It now has been found that certain chlorine-containing polymers of ethylene are considerably more soluble than polyethylene in molten hydrocarbon waxes and, in addition, wax compositions containing these chlorine-containing polymers of ethylene have superior heat sealing and flexibility properties so that they are superior for use as coating or laminating agents when the chlorine-containing polymers are at low concentrations in the wax. When higher concentrations of these chlorine-containing polymers of ethylene are compounded in the wax, the resulting compositions are also suitable for application in the field of plastics. For example, these compositions are rather flexible and some may be processed in the form of unsupported films while others may be extruded readily or are particularly suitable for injection molding or slush molding operations.

It is an object of this invention to provide compositions of a hydrocarbon wax and chlorine-containing polymers of ethylene.

It is another object of this invention to provide compositions of a petroleum hydrocarbon wax and a chlorine-containing polymer of ethylene which have superior coating and laminating properties.

It is another object of this invention to provide compositions of a petroleum hydrocarbon wax and a chlorine-containing polymer of ethylene which have plastic properties and can be fabricated in conventional plastic processing equipment.

Other objects of this invention will be apparent from the description that follows and the claims.

The compositions of this invention are prepared by admixing a hydrocarbon wax, particularly a hydrocarbon wax of petroleum origin, such as paraffin wax, microcrystalline wax, or mixtures thereof, with a chlorine-containing polymer of ethylene. The paraffin waxes which are suitable for use in this invention are those melting between about 100° F. and 160° F. In particular, paraffin waxes melting between about 120° F. and 155° F. are suitable. Petroleum microcrystalline waxes melting between about 130° F. and 200° F., in particular from 145° F. to 180° F., are also suitable for use in this invention. Higher melting point waxes, for example, the so-called Fischer-Tropsch waxes melting in the range of from 200° F. to 220° F. may also be employed as well as mixtures of these various hydrocarbon waxes.

The chlorine-containing polymers of ethylene suitable for use in compositions with the above-mentioned hydrocarbon waxes are chlorinated ethylene polymers, and copolymers of ethylene with vinyl chloride. The term "chlorinated ethylene polymers" as used herein and in the claims means chlorinated polyethylenes as well as chlorinated copolymers of ethylene with other monomers such as the chlorinated copolymers of ethylene with propylene or higher alpha olefins. Particularly preferred are the chlorinated polyethylenes and the copolymers of ethylene with vinyl chloride. It has been found that the chlorine content of these chlorine-containing polymers of ethylene should range from 2 percent to 25 percent by weight. The chlorine content should not exceed about 25 percent by weight since chlorine contents above this limit give polymers which are incompatible with the wax at elevated temperatures including temperatures above the melting point of the chlorine-containing polymer of ethylene. Thus, if one of these high chlorine content polymers of ethylene is admixed with wax at a temperature above the melting point of the polymer, there will be formed two immiscible liquid phases. Chlorine-containing polymers of ethylene having chlorine contents below about 2 percent do not give sufficient improvement in properties to the wax composition.

The quantity of the chlorine-containing polymer of ethylene may range between 0.5 weight percent and 70 weight percent based on the total composition. When the chlorine-containing polymer of ethylene is present in amounts of the order of 0.5 percent to 2 percent by weight, the resulting wax-polymer compositions have superior heat sealing and flexibility properties and are especially suitable for use as coating or laminating agents. When the chlorine-containing polymer of ethylene is present in an amount about equal to that of the wax and up to 70 percent of the total composition, the resulting compositions are particularly suitable for injection molding operations.

The chlorinated polyethylene is obtained by chlorinating according to conventional methods polyethylene polymers ranging in molecular weight from about 2,000 to 1,000,000. Polyethylenes made by either high or medium pressure processes or by low pressure processes may be utilized.

A preferred method of chlorination involves dissolving the polyethylene in a solvent such as carbon tetrachloride or symmetrical tetrachloroethane in amounts such that the solution contains up to about 10 weight percent of polymer. Higher concentrations of polyethylene give solutions which are too viscous to permit good contact with the gaseous chlorine in the subsequent chlorination step. When carbon tetrachloride is utilized as the solvent the solution is heated to 70° C.–75° C. and the chlorine gas is bubbled into the solution while the solution is agitated constantly. If the polymer is dissolved in symmetrical tetracholroethane somewhat higher temperatures are preferred, generally of the order of 115° C. With polymers at the higher end of the molecular weight range it is necessary to use somewhat more dilute solutions and somewhat higher reaction temperatures, up to 140° C. for example, in order to obtain desired chlorinated efficiencies. The chlorination reaction is continued until the desired amount of chlorine has been introduced into the polyethylene. The hot solution is stripped free of chlorine with an inert gas such as nitrogen and thereafter is poured slowly into methanol to precipitate the chlorinated polyethylene. The chlorinated polymer is filtered free of methanol and solvent and thereafter washed with successive portions of methanol until it is free of solvent. Finally, the chlorinated polymer is vacuum dried in an oven at a temperature of about 50° C.

Another method which may be utilized involves suspending uncompacted solid polyethylene in water, for example, by injecting the solid polyethylene formed at elevated temperatures and pressures into water in a reaction vessel, thereafter cooling the water at substantially atmospheric pressure and passing chlorine gas through the suspension at a temperature ranging between 10° C. and 100° C. while agitating the suspension and irradiating it with actinic light. Preferably, the temperature of the suspension of polymer particles during chlorination should be from 15° C. to 70° C. and the suspension should be irradiated with light of a wave length ranging between 2800 and 6000 Angstrom units. Preferably also the suspension should consist of at least 9 parts of water to 1 part of polymer. The suspension of the polymer in the water may be facilitated by the use of a wetting agent.

Other methods of chlorinating polyethylene have been described in both the technical literature and the patented art and may be utilized to prepare the chlorinated polyethylenes for use in this invention.

The copolymers of ethylene with propylene are preferably prepared by conventional methods, for example, by the use of the metal halide-organo aluminum catalysts such as vanadium oxychloride-aluminum triisobutyl or titanium tetrachloride-aluminum triisobutyl catalysts. These polymers may be prepared either by admixing the ethylene and propylene monomers and thereafter polymerizing the mixture or by separately partially polymerizing the ethylene and the propylene and thereafter admixing the polymers and completing the polymerization reaction to form the so-called block polymers. The preferred copolymers are in the same molecular weight range as that of the polyethylenes. The copolymers of ethylene with propylene may be chlorinated in the same manner as has been described for the polyethylenes, in particular, the solvent methods are preferred.

The copolymerization of ethylene with higher alpha olefins has also been described in the technical literature and patented art and these copolymers which are also preferably in the same molecular weight range as for polyethylene may likewise be chlorinated according to the methods which have been described for chlorinated polyethylene to produce the chlorinated copolymers suitable for use in the compositions of this invention. The $C_4$–$C_{16}$ alpha olefins are preferred.

The copolymerization of ethylene with vinyl chloride has also been widely described in both the technical literature and the patented art. Copolymers particularly suitable for this invention have a minimum molecular weight of 10,000 and preferably range from 20,000 to 50,000. They are preferably prepared by the alkaline polymerization of ethylene and vinyl chloride in the presence of an organic peroxide catalyst and in the presence of buffer salts. In such a process, for example, water, sodium borate, and benzoyl peroxide are charged to a stainless steel rocking autoclave. Vinyl chloride is then transferred into the autoclave and finally ethylene is introduced into the autoclave at a pressure which will attain the desired reaction pressure when the mixture is heated to reaction temperatures. In general, reaction temperatures of approximately 80° C. are utilized with reaction pressures of from 10,000 p.s.i. to 20,000 p.s.i. and the pressure is maintained by intermittent injection of ethylene during the reaction time which may range from 12 to 36 hours. Rather wide variations from these general conditions are well known to the art of producing such polymers. In general, the pH of such a reaction is preferably maintained at about 8.7 to 9 and it may range between 7.2 and 11. Mole ratios of ethylene to vinyl chloride in the product may range from 0.4 to 7, i.e., 47.3 weight percent chlorine to 13.6 weight percent chlorine respectively. Variations in reaction conditions including variations in time, temperature, degree of agitation and the like can be utilized, however, to produce polymers having compositions outside of this range in accordance with methods well known to the art.

Since the wax-polymer compositions of this invention are subjected to relatively high temperatures during fabrication it is necessary to provide thermal stability to the chlorine-containing polymers of ethylene. The conventional stabilizers for ethylene-vinyl chloride copolymers may be utilized, for example, the alkaline earth and alkali metal oxides, hydroxides or fatty acid salts, cadmium and calcium stearates, lead salts, including lead oxide, barium-cadmium complex compounds, barium-cadmium-zinc complex compounds, alkyl and aryl tin compounds, salicylates, and other compounds well known to the art. These compounds are commercially available both in the form of liquids and solids.

The quantities utilized are relatively small and generally range from 0.1 weight percent to 2 weight percent based on the weight of the chlorine-containing polymers of ethylene.

The following examples are provided to illustrate specific embodiments of the invention and to provide a further detailed description of the invention.

EXAMPLE I

A sample of low pressure process polyethylene having an average molecular weight ranging between 180,000 and 250,000 was divided into several portions which were chlorinated to various chlorine contents by dissolving 100 grams of the polyethylene in 4000 milliliters of tetrachloroethane and carrying out the chlorination by introducing chlorine gas into the solution at 115° C. for sufficient times to obtain the desired chlorine contents. The hot solution was stripped clean with nitrogen and thereafter it was poured slowly into methanol to precipitate the chlorinated polyethylene. The chlorinated polyethylene was filtered to remove methanol and solvent and washed with successive portions of methanol until free of solvent. Finally, the chlorinated polymer was vacuum dried in an oven at a temperature of about 50° C.

A second sample of commercial polyethylene made by the medium pressure process and having an average molecular weight of about 23,000, an intrinsic viscosity of 0.87 (ASTM Method D1601–58T) and a density of 0.92 was divided into several portions which were chlorinated to various chlorine contents. The chlorination was carried out by dissolving 200 grams of the polyethylene in 4000 ml. of CCl₄ and introducing chlorine into the solution at a temperature from 70° C. to 75° C. The chlorine was introduced for sufficient time to obtain the desired chlorine contents in the polymer and thereafter the hot solution was stripped clean with nitrogen and poured into methanol and finished in the same way as described for the previous chlorinated products of the low pressure polyethylene.

The compatibility of these chlorinated polyethylenes with molten wax was tested by heating a mixture of a petroleum paraffin wax of about 75 percent n-paraffin content having a melting point of about 150° F. with 10 percent and also with 1 percent of the chlorinated polymer. The wax and polymer were mixed at about 140° C. and the mixture allowed to stand for 18 hours at 100° C. and at 70° C. The results of these experiments are set forth in Table I.

same method as in Example I. A portion of each of the chlorinated samples was admixed with an equal weight of the high normal-paraffin content paraffin wax having a melting point of 150° F. utilized in Example I. The mixing was carried out in a commercial high shear mixer at a temperature above the melting point of the wax and above the softening point of the chlorinated polymer. Tensile strengths and elongations were determined by ASTM Method D412–51T (Die D) on each sample of the chlorinated polyethylene and on the 50–50 mixture of chlorinated polyethylene in paraffin wax.

Flexural modulus was measured by ASTM method D797–58 and melt index was determined by ASTM Method D1238–57T on the samples. In addition, the flex life of the samples was determined by subjecting molded strips of each sample to repeated 85° angle bends

*Table I*

| Polyethylene, mol. wt. | Wt. Percent Chlorine in C.P.E.[1] | 90 Wt. Percent Wax 10 Wt. Percent C.P.E.[1] at 100° C. | 99 Wt. Percent Wax 1 Wt. Percent C.P.E.[1] | |
|---|---|---|---|---|
| | | | At 100° C. | At 70° C. |
| 180,000–250,000 | 0.0 | Very thick, gelatinous solution (solidifies above 100° C.). | Clear solution | Solidifies >70° C. |
| 180,000–250,000 | 4.0 | | do | Fluid, polymer settles. |
| 180,000–250,000 | 6.4 | Thick, gelatinous solution (solidifies sl. above 100° C.). | Cloudy solution, no settling. | Fluid, very slight settling. |
| 180,000–250,000 | 18.9 | | do | Do. |
| 180,000–250,000 | 21.6 | Thick, heavy syrup (solidifies below 80°C.). | do | Fluid, settling. |
| 23,000 | 0.0 | Clear solution | Clear solution | Settling. |
| 23,000 | 5.4 | Very slightly cloudy, no settling | do | Cloudy, no settling. |
| 23,000 | 17.1 | Slightly cloudy, very sl. settling | | |
| 23,000 | 22.8 | Not completely dissolved | Some settling | Cloudy, some settling. |
| 23,000 | 30.0 | Insoluble | Insoluble | Insoluble. |

[1] Chlorinated polyethylene.

It will be seen from these experiments that, as the chlorine content of the chlorinated polyethylene increases, the solubility of the chlorinated polyethylene in wax also increases up to about 22 percent chlorine in the polyethylene and thereafter, as the chlorine content is increased, the chlorinated polymer rapidly becomes more incompatible with the wax so that at about 25 percent chlorine it has lost its compatibility characteristics and at about 30 percent chlorine it is completely insoluble in the wax. These observations are apparent if one compares the compatibility as the chlorine content changes for experiments conducted at the same temperature and by comparing the compatibility at two different temperatures for the same percent chlorinated polyethylene in the wax.

at a flex rate of 75 flexes per minute at a temperature of 73° F. and a relative humidity of 40 percent, each completed flex being counted as a cycle and the flex life being the total number of cycles to failure.

The results of these experiments are set forth in Table II.

*Table II*

| Composition | Tensile Strength, p.s.i. | Ultimate Elongation, Percent | Flexural Modulus, p.s.i. | Flex Life Cycles to Failure | Melt Index |
|---|---|---|---|---|---|
| Polyethylene | 2,000 | 200 | 16,000 | >100,000 | 0.3 |
| C.P.E.[1] (5.4% Cl) | 2,700 | 60 | 13,000 | | |
| C.P.E. (9.2% Cl) | 1,900 | 80 | 7,000 | >100,000 | 0.6 |
| C.P.E. (9.7% Cl) | 1,800 | 100 | 7,000 | >100,000 | 0.7 |
| C.P.E. (14.9% Cl) | 1,200 | 100 | 5,000 | >100,000 | 0.3 |
| C.P.E. (17.4% Cl) | 1,200 | 70 | 4,000 | >100,000 | 0.5 |
| 50 wt. percent C.P.E. of 5.4% Cl, 50 wt. percent wax | 1,500 | 20 | 54,000 | 0 | ~200 |
| 50 wt. percent C.P.E. of 9.2% Cl, 50 wt. percent wax | 1,400 | 40 | 57,000 | 1,200 | 250 |
| 50 wt. percent C.P.E. of 9.7% Cl, 50 wt. percent wax | 1,300 | 50 | 32,000 | 4,550 | 210 |
| 50 wt. percent C.P.E. of 14.9% Cl, 50 wt. percent wax | 1,100 | 80 | 25,000 | >100,000 | 250 |
| 50 wt. percent C.P.E. of 17.4% Cl, 50 wt. percent wax | 900 | 70 | 27,000 | >100,000 | 230 |

[1] Chlorinated polyethylene.

EXAMPLE II

A second sample of the same commercial polyethylene of 23,000 molecular weight used in Example I was divided into several portions which were chlorinated to various chlorine contents (given in weight percent) utilizing the These data show that as the amount of chlorine in the polymer increases the tensile strength decreases and the stiffness, as measured by flexural modulus, increases.

When the chlorinated polymer and wax are combined, the resulting compositions show a high melt index, corresponding to low melt viscosity, thus showing that such compositions are particularly suitable for injection molding processing and coating operations.

The paraffin wax-chlorinated polymers also show a large increase in stiffness over the chlorinated polymers and with the higher chlorine content polymers this stiffness property is accompanied by excellent flexibility properties as shown by flex life. Moreover, the paraffin wax-chlorinated polymer compositions have excellent tensile strengths and ultimate elongation (elongation at break), since the paraffin wax has a tensile strength of only of the order 100 p.s.i.

EXAMPLE III

A sample of commercial high density polyethylene made by the low pressure process having an average molecular weight of about 50,000, an intrinsic viscosity of 1.4 and a density of 0.96 was chlorinated to a chlorine content of 6.7 weight percent by the use of tetrachloroethane as the solvent and the method described for the first sample in Example I. The chlorinated polymer was admixed with an equal weight of the same 150° F. melting point paraffin wax employed in Examples I and II and the resulting blend was tested for tensile strength and elongation as in Example II.

The chlorinated polymer had a tensile strength of 3,900 p.s.i and a percent elongation of 60, the polymer-wax blend had a tensile strength of 2,200 p.s.i. and percent elongation of 20, showing that the blend had comparable characteristics to those of the corresponding chlorine content polymer-wax blend of Example II.

EXAMPLE IV

A sample of ethylene was copolymerized with vinyl chloride in a 2.5 liter stainless steel rocking autoclave having a maximum working pressure of 20,000 pounds per square inch. This autoclave was charged with 5 grams of sodium borate, 1 gram of benzoyl peroxide and 875 milliliters of water which had been distilled in a nitrogen atmosphere. Pure liquid vinyl chloride was transferred to the vessel with the aid of nitrogen pressure to maintain it in the liquid phase and finally ethylene which has been deoxygenated by being passed over heated copper turnings at 250° C. was pumped into the autoclave by means of a high pressure hydraulic pump until the desired initial pressure was obtained. Rocking was started and heat applied. Runs were carried out at approximately 80° C. with intermittent addition of ethylene during the run to maintain the desired reaction pressure, the conditions being set forth in Table III. The products were all in the 20,000 to 150,000 molecular weight range.

*Table III*

| Copolymer No. | Vinyl Chloride Charge (gms.) | Pressure, p.s.i. | | Reaction Time (Hrs.) | Product Copolymer Composition | |
|---|---|---|---|---|---|---|
| | | Initial at 25° C. | Reaction at 80° C. | | Wt. Percent Cl | Ethylene to Vinyl Chloride, mole ratio |
| 1 | 75 | 8,800 | 12,000–16,500 | 26 | 13.8 | 6.9 |
| 2 | 156 | 8,200 | 11,000–16,700 | 15 | 15.5 | 5.9 |
| 3 | 375 | 8,500 | 17,000 | 33 | 32.0 | 1.7 |

Copolymer No. 1 was admixed with an equal weight of the same 150° F. melting point paraffin wax employed in the previous examples and the resulting blend was tested as in Example II.

Copolymer No. 3 containing 32 weight percent chlorine was found to be completely insoluble in the wax.

Copolymers without being admixed with wax were also tested as in Example II. The results of these tests are set forth in Table IV.

*Table IV*

| Composition | Tensile Strength, p.s.i. | Ultimate Elongation, Percent | Flexural Modulus, p.s.i. |
|---|---|---|---|
| Copolymer No. 1 | 900 | 320 | 9,000 |
| Copolymer No. 2 | 500 | 190 | 8,000 |
| Copolymer No. 3 | 400 | 140 | |
| 50 wt. percent Copolymer No. 1, 50 wt. percent wax | 900 | 10 | 53,000 |

The same observations made with respect to the compositions of Examples II and III also were made with the ethylene vinyl chloride copolymer-wax compositions, namely that the blend shows a large increase in stiffness as compared with the copolymer without the wax and the blend exhibits excellent tensile strength characteristics.

EXAMPLE V

A chlorinated polyethylene polymer containing 16 weight percent chlorine was substituted for the polyethylene in a premium grade dairy wax. The same polyethylene utilized as the second sample of Example I (23,000 mol. wt.) was utilized and was chlorinated in the same manner as described for Example I. The base wax amounting to 98 weight percent of the composition consisted of a mixture of paraffin waxes and microcrystalline waxes. The quantity of chlorinated polyethylene amounted to 2 percent by weight of the total composition. This was compared with the same premium grade dairy wax containing 2 percent of the same molecular weight polyethylene which had not been chlorinated. It was found that the properties of the dairy wax containing the chlorinated polyethylene as compared with the properties of the dairy wax containing the unchlorinated polyethylene were substantially the same except that the seal strength of the chlorinated polyethylene in wax composition was substantially superior to that of the wax containing the non-chlorinated polyethylene. In addition, it was found that the chlorinated polyethylene wax product could be heated to a temperature of 300° F. without having the chlorinated polymer settle out of solution whereas if the wax containing the non-chlorinated polyethylene were heated to a temperature above the melting point of the wax the polyethylene would start to settle out.

We claim:

1. A composition consisting essentially of a hydrocarbon wax and from 0.5 weight percent to 70 weight percent based on the weight of the total composition of a copolymer of ethylene with vinyl chloride, said copolymer containing from 2 weight percent to 25 weight percent chlorine.

2. A composition having a high melt index consisting essentially of a paraffin wax and from 50 weight percent to 70 weight percent based on the weight of the total composition of a chlorinated polyethylene, said chlorinated polyethylene containing from 2 weight percent to 25 weight percent chlorine.

3. A composition having a high melt index consisting essentially of a paraffin wax and from 50 weight percent to 70 weight percent based on the weight of the total composition of a copolymer of ethylene with vinyl chloride, said copolymer containing from 2 weight percent to 25 weight percent chlorine.

References Cited by the Examiner

UNITED STATES PATENTS

| 2,298,833 | 10/42 | Muessig | 260—28.5 |
| 2,467,550 | 4/49 | Fletcher et al. | 260—28.5 |
| 2,480,008 | 8/49 | Anderson | 260—28.5 |
| 2,748,095 | 5/56 | Kling | 260—28.5 |

MORRIS LIEBMAN, *Primary Examiner.*

ALPHONSO D. SULLIVAN, *Examiner.*

UNITED STATES PATENT OFFICE
CERTIFICATE OF CORRECTION

Patent No. 3,200,093
August 10, 1965
Richard W. Sauer et al.

It is hereby certified that error appears in the above numbered patent requiring correction and that the said Letters Patent should read as corrected below.

Columns 5 and 6, Table I, third column, third line from the bottom, for "clTudy" read -- cloudy --; column 6, line 64, for "increases" read -- decreases --.

Signed and sealed this 1st day of February 1966.

(SEAL)
Attest:

ERNEST W. SWIDER
Attesting Officer

EDWARD J. BRENNER
Commissioner of Patents